United States Patent [19]

Pullen

[11] Patent Number: 4,535,366
[45] Date of Patent: Aug. 13, 1985

[54] UNIVERSAL VIDEO DATA PLAYBACK

[75] Inventor: Alan J. Pullen, Canoga Park, Calif.

[73] Assignee: Discovision Associates, Costa Mesa, Calif.

[21] Appl. No.: 350,858

[22] Filed: Feb. 22, 1982

[51] Int. Cl.³ .......................... H04N 5/76; H04N 7/08
[52] U.S. Cl. .................................... 358/342; 358/319; 358/335; 360/37.1
[58] Field of Search .............. 358/319, 335, 342, 145, 358/148; 360/37.1, 32, 8, 9; 369/59

[56] References Cited

U.S. PATENT DOCUMENTS

| | | | |
|---|---|---|---|
| 3,978,284 | 8/1976 | Yoshino et al. | 358/148 X |
| 4,156,253 | 5/1979 | Steudel | 358/145 X |
| 4,175,270 | 11/1979 | Zenzefilis | 358/342 X |
| 4,303,940 | 12/1981 | Ciciora | 358/148 X |
| 4,349,839 | 9/1982 | McGinn | 358/148 |
| 4,357,626 | 11/1982 | Romeas | 360/37.1 |

FOREIGN PATENT DOCUMENTS

| | | | |
|---|---|---|---|
| 0109413 | 8/1979 | Japan | 360/32 |
| 03479 | 1/1982 | Japan | 358/148 |

OTHER PUBLICATIONS

Digital Transmission of Two Television Sound Signals During Horizontal Blanking Maegele; Journal SMPTE, vol. 84, Feb. 1975, pp. 68-70.

Primary Examiner—Raymond F. Cardillo, Jr.
Assistant Examiner—Alan K. Aldous
Attorney, Agent, or Firm—Ronald J. Clark

[57] ABSTRACT

Method and apparatus for the recording onto a recording medium and playback of digital data, such as digitally encoded audio data, such that the recording medium is playable on either of two different commercial television format video type players. For example, according to the present invention an optical disc having digitally encoded audio data recorded thereon may be playable on either a PAL compatible or an NTSC compatible optical video disc player with minimal modification of the player.

6 Claims, 13 Drawing Figures

UNIVERSAL VIDEO DATA PLAYBACK

BACKGROUND OF THE INVENTION

1. Field of the Invention

The present invention relates to data recording and playback, and more particularly relates to the recording of digital data onto a recording medium such that said medium is suitable for playback on video playback apparatus adapted for different video signal formats.

2. Background Art

The development over the past several years of the optical disc has led to the recent commercialization of the video optical disc. The video optical disc is a disc approximately the size of an LP phonograph record which, instead of the grooves of a phonograph record, has recorded thereon spiral tracks of optically readable indicia. The disc is read by imaging a beam of laser light to a tiny spot on a track, rotating the disc so as to effect scanning of the spot along the track, and recording the laser light which emerges from the disc modulated by the pattern of the indicia along the track. Video optical discs have relately large storage capacity and, for example, can provide over two hours of video playtime per disc.

The large storage capacity of the optical disc has led to the development of other applications besides the recording of video program information for later playback. For example, the optical disc is being developed as a data storage medium for digital computers.

Another desired application is the recording of digitized audio information for later playback. It is known, for it example, that very high fidelity audio recording can be effected by using pulse code modulation ("PCM") techniques. PCM encoding and recording techniques have been used in connection with conventional phonograph records to preserve fidelity and signal to noise ratio in the signal processing between performance and the recording on the record.

The optical disc may be used to record such PCM encoded audio directly, due to the high information storage capability of the disc.

It is desired to record such PCM encoded audio data onto an optical disc such that the disc can be played on a conventional video disc player apparatus with minimum necessary modification for such digitized audio playback. This would permit the utilization of existing video optical disc player apparatus technology to a large extent to permit, for example, the use of a single apparatus for video optical disc and audio optical disc playback.

A problem posed in achieving such a result is that video optical discs and their associated players are typically standardized to the local commercial television formats, and such formats are not uniform throughout the world. For example, in the United States, under the NTSC format, horizontal intervals are provided at a frequency of approximately 15 kilohertz, and 525 lines are provided in each frame of video information. In Europe, under the PAL format, the horizontal interval frequency is approximately the same; however, 625 horizontal lines are provided for each frame of video.

Consequently, video discs and their associated video disc player apparatus are different in United States and Europe, each being designed for compatibility with commercial television sets for the respective formats. It is desired to provide encoded audio optical discs compatible for playback on video optical disc players of either format. This would permit a commercial standardization of such discs similar to that which exists in the phonograph industry.

However, due to the differences in formats, such a standardization has heretofore been impossible. Video optical disc player apparatus have internal circuits associated with the maintenance of precise disc rotation speed which circuits are directly tied to the horizontal and vertical sync pulses recovered from the video disc. These circuits depend upon the ratio of the vertical sync pulses to horizontal sync pulses for their function. When, for example, a video disc formatted for broadcast format is played on a player apparatus designed for another broadcasting format, the imcompatible ratio of vertical sync pulses to horizontal sync pulses results in disruption of the internal circuitry of the apparatus and unsynchronized signal recovery.

The present invention overcomes these problems and provides a method and apparatus for the recording and playback of encoded audio information such that optical discs provided with such encoded audio data in this format may be played on video optical disc player apparatus of either of at least two different video broadcasting formats while providing smooth and uninterupted playback of the audio.

SUMMARY OF THE INVENTION

The present invention resides in a method and apparatus for providing encoded digital data on a recording medium, such as an optical disc, such that the recording medium is compatible for playback on a suitably modified optical disc player apparatus for either of at least a first and a second video formats. The stream of data is divided into contiguous segments, and provided as video level signals. A series of pulses are provided at substantially the horizontal line repetition rate. The pulses and segments of digital data signals are combined to form a composite signal such that the segments alternate with the pulses in time, and the composite signal is recorded onto the recording medium. In the recovery and playback of the data, the recording medium is read to recover the recorded signals. The pulses are separated from the recovered signal and vertical sync pulses are synthesized from the recovered pulses at the appropriate rate for the recording medium player. The synthesized vertical sync pulses are provided to those player apparatus circuits which use vertical sync pulses, and the recovered data signals are thereby provided at the appropriate rate by the player.

The present invention is suitable for use, for example, in connection with optical disc player apparatus designed for NTSC and PAL video formats. The horizontal frequencies of PAL and NTSC differ only by 0.7%. A player apparatus can be easily modified to compensate for this slight difference to provided an appropriate playback rate.

It will be appreciated from the foregoing that the present invention represents a significant advance in the field of audio recording and playback systems, as well as in data storage and playback systems in general. In particular, the invention provides an effective technique for the recording of encoded audio information onto an optical disc such that the optical disc is suitable for playback on either of two standard video formats. Other aspects and advantages of the present invention will become apparent for the following more details descriptions, taken in conjunction with the accompanying drawings.

BRIEF DESCRIPTION OF THE DRAWINGS

FIG. 7 is a block diagram of a data encoder for use in connection with an FM modulator.

DETAILED DESCRIPTION OF THE PREFERRED EMBODIMENT

Figure 1:
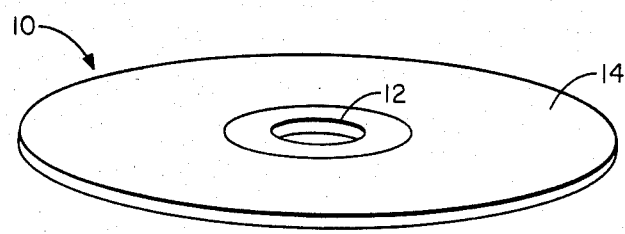
FIG. 1 is an orthogonal view of a standard commercial optical disc.

FIG. 1 shows a standard commercial video optical disc 10. The disc 10 is approximately the size of a standard LP phonograph record, and has a central aperture 12 to which the spindle of a player apparatus (not shown) is inserted whereby the disc may be rotated for the scanning of a spot of laser light along spiral information tracks recorded thereon. The information tracks are recorded in an annular information area 14 on a surface of each side of the disc. Typically, the disc 10 made from two transparent disc-shaped parts which are glued together, with the annular recording area 14 for each part comprising the interior surface of each such part. In this way, the annular area 14 of the recording surface for each side of the disc is protected from the effect of exposure, handling, and the like. The disc is read by imaging the "reading" laser light through the transparent disc material to the recording surface.

In a typical method of encoding video information for an optical disc, the composite video signal is used to frequency modulate a carrier signal having a frequency of approximately 8 megahertz, and the zero crossings of the frequency modulated signal are used to determine the length and spatial frequency of the indicia along the tracks on the disc 10. Techniques for the manufacture of such discs, and for the encoding and recording on the recording surface thereof are known, and can be found, for example, in U.S. Pat. Nos. 3,530,258, 4,141,731, and 4,185,955.

Player apparatus for such optical disc utilize a beam of laser light which is imaged to a spot on a track of a disc and a detector which detects the light which is reflected and scattered from the disc. According to one arrangement, the optical system is fixed with respect to the player apparatus, and scanning of the beam is provided for the disc by placing the disc on a spindle assembly, rotating the spindle and translating the spindle assembly so as to effect a spiral scanning in the configuration of the tracks of recorded information thereon. Details of construction of such an optical disc player apparatus can be found in U.S. patent application Ser. No. 131,513, filed on Mar. 18, 1980, and commonly assigned to the assignee of the present invention, docket no. 78002.1.

The synchronization of the spindle rotation mechanism is typically maintained by the detection of the video signal read off of the disc, the separation of the vertical and horizontal sync pulses contained therein, and the application of the vertical and horizontal sync pulses to the electric circuitry associated with the aforementioned mechanism.

In one such player, for example, the video disc player Model PR-7820 distributed by Discovision Associates, 3300 Hyland Avenue, Costa Mesa, Calif. 92626, the vertical sync pulses are detected and utilized in a course adjustment subcircuit while the horizontal sync pulses are detected and utilized in a fine adjustment subcircuit in a spindle servo control circuit. In this circuit, the phase difference between a reference sync pulse source and the sync pulses recovered from the disc is detected, and an error signal corresponding thereto is generated. This error signal is used in a servo loop to control the rotation of the spindle to ensure that the signal recovered from the disc is played at the proper rate.

Figure 2:
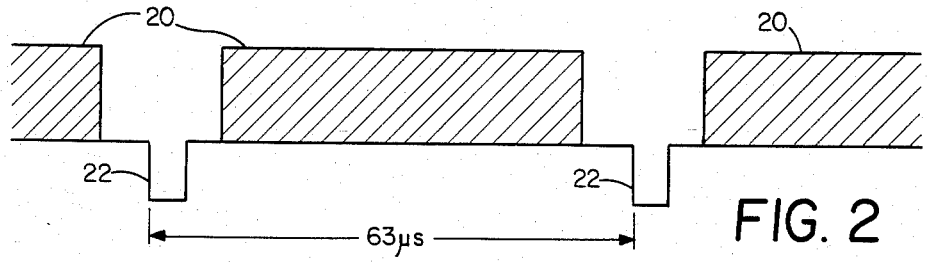
FIG. 2 is a diagram of a signal suitable for recording according to the principles of the present inventions.

FIG. 2 is a diagram of a signal containing encoded digital data arranged according to the principles of the present invention. The encoded digital data is provided in discrete segments as luminance signals between a series of horizontal sync pulses 22. The horizontal sync pulses 22 are provided at intervals of 63 microseconds, corresponding to a horizontal line repitition rate of 15.873 kilohertz, which is close to the horizontal line repetition rate for NTSC and PAL formats. The encoded data is provided in a continuous series of contiguous segments 20 arranged sequentially between horizontal sync pulses 22. No vertical sync pulses appear in the signal.

Figure 3:
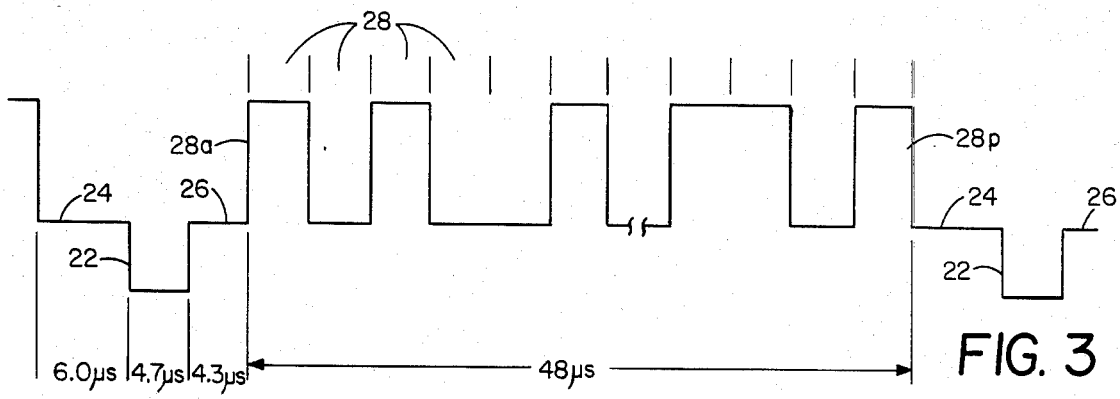
FIG. 3 is a more detailed view of a section of the signal shown in FIG. 2.

FIG. 3 is a more detailed view of a portion of the signal shown in FIG. 2. As can be seen, in the horizontal sync interval a "front porch" of 6.0 microseconds and a "back porch" of 4.3 microseconds are provided preceding and succeeding respectively, a horizontal sync pulse of 4.7 microseconds. Between the back porch and front porch of succeeding horizontal sync intervals, encoded data is provided for a duration of forty-eight microseconds. This forty-eight microsecond interval is divided into 16 three microsecond bit cells 28a-p. These 16 bit cells 28 together comprise a single 16 bit word of "PCM" data. In this embodiment each 16 bit word of PCM data corresponds to a waveform sample taken at a 63 microsecond sample rate. This corresponds to a sample frequency of 15.873 kilohertz. Therefore, by decoding the PCM words 20 at the rate at which they appear in the composite waveform, the analog waveform corresponding to the PCM data 20 can be properly decoded.

Figure 4:
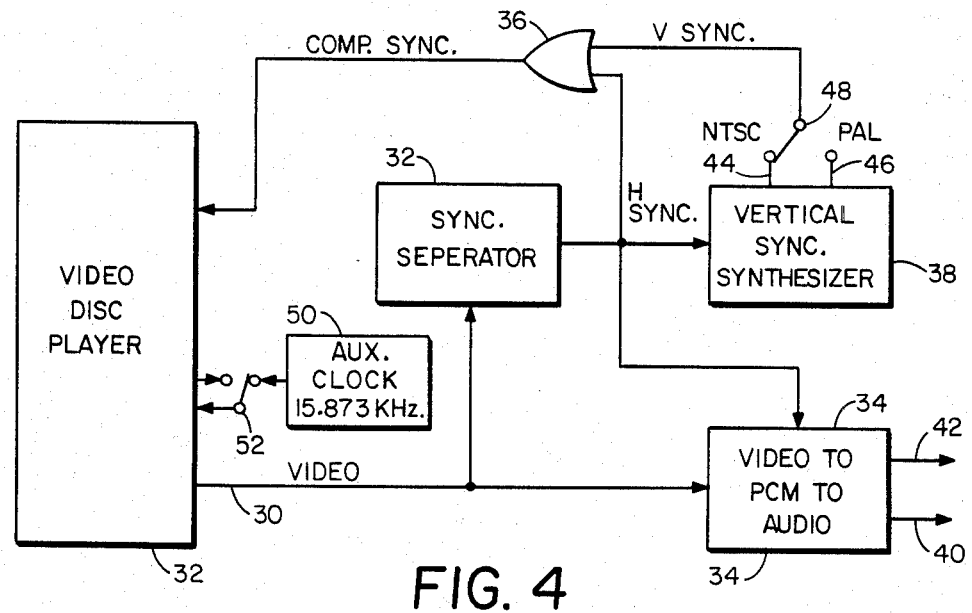
FIG. 4 is a block diagram of a video disc player apparatus modified in accordance with the principles for the present convention.

FIG. 4 is a block diagram of a video optical disc player apparatus modified in accordance with the principals of the present invention. The video output 30 from a video disc player 32 is applied to a conventional sync separator 32 and to a decoder 34 which converts the PCM data on line 30 into PCM words at the appropriate rate for decoding. The sync separator 32 separates the horizontal sync pulses 22 (FIG. 2) from the video waveform supplied to it on line 30. The separated horizontal sync pulses are applied to one input of an OR gate 36, to the input of a vertical sync synthesizer 38, and to a second input of converter 34. The converter 34 outputs PCM data at TTL levels on line 40 and a series of clock pulses at TTL levels on line 42, both of which are utilized for subsequent decoding of the PCM data into an analog waveform, according to conventional techniques.

The vertical sync synthesizer 38 has two outputs 44 and 46. The second input of OR gate 36 is switchable between these outputs 44 and 46 by way of a switch 48. The output of OR gate 36 is applied to the player apparatus 32, and is connected to circuitry therein utilized in the control of the player spindle (not shown) in the place of the composite sync normally derived by the player circuitry from the video signal recovered from the disc being played.

An auxiliary clock 50 produces a square wave output at a rate of 15.873 kilohertz. The output of the auxiliary clock 50 is switchable to be applied to the reference clock line in the spindle servo circuitry of the player 32 by way of a second switch 52.

In operation the recovered horizontal sync pulses outputted by sync separator 32 are applied to the vertical sync synthesizer 38 which generates, using conventional countdown circuitry, synthesized vertical sync pulses at a rate appropriate for either PAL or NTSC format. Thus, for example, for PAL format the vertical sync synthesizer 38 counts horizontal sync pulses and outputs a pulse every 312.5 horizontal sync pulses counted. This synthesized pulse output is applied to line 46. For NTSC format the horizontal sync pulses are applied to a circuit which generates a pulse output every 262.5 horizontal sync pulses counted, and this output is applied to line 44. When the output on line 44 or 46 is applied to OR gate 36 along with the recovered horizontal sync pulses from sync separator 32, the output of OR gate 36 is in the form of the composite sync pulse waveform which would be recovered from a video disc played according to the NTSC or PAL format, as appropriate.

By applying the output of OR gate 36 to those subcircuits in the player apparatus 32 which normally utilize the recovered composite sync from the disc being played, the player apparatus 32 circuitry is provided with the necessary vertical and horizontal sync pulses for it to synchronize the rotation of the spindle so that the spindle will be rotated at the appropriate rate to ensure relatively constant reading of the signal from the disc, despite variations which may exist in the tracks, eccentricity in the placement of the tracks, and the like.

The auxiliary clock 50 produces a 15.873 kilohertz square wave signal as an output. This output is used in the place of the reference oscillator provided with most conventional video optical disc players. The 15.873 kilohertz clock rate of clock 50 ensures that the spindle servo, when in locked condition, will cause the signals read off of the disc to be recovered at a rate so as to provide the horizontal sync pulses 22 (FIG. 2) at intervals of sixty-three microseconds. This clock rate of 15.873 kilohertz is slightly different from the horizontal sync pulse rate in both PAL and NTSC formats. However, the clock rate is close enough to the horizontal sync rates in both of these formats so that this rate can be used in connection with player apparatus for either format without further modification of the circuitry to compensate for this difference.

Details of circuitry for converting to an analog waveform the PCM pulses outputted on line 40 at the clock rate of the pulses on line 42 are not described in detail herein, because such circuitry is well known in the art.

Figure 5:
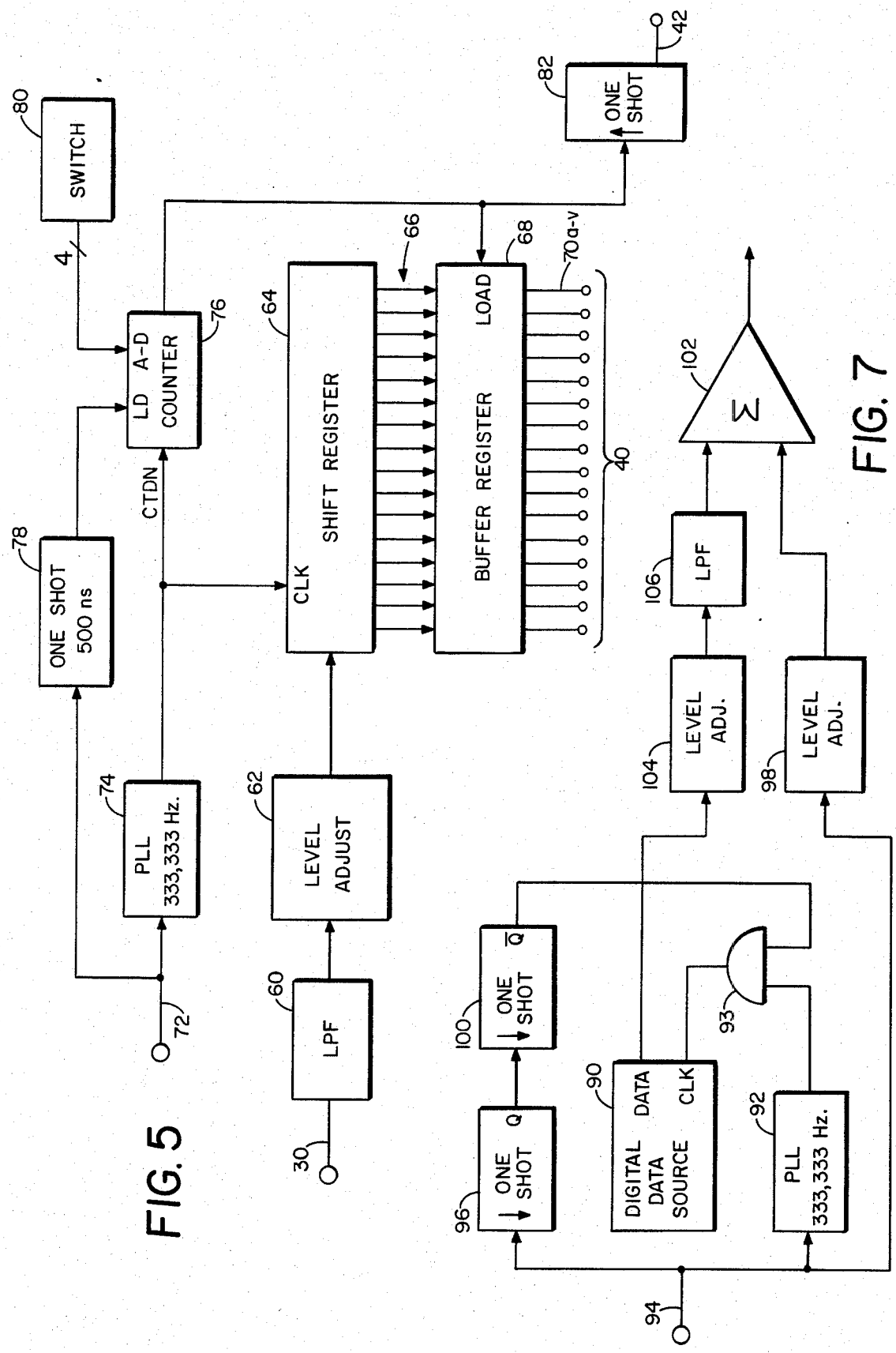
FIG. 5 is a block diagram of a decoder useable in connection with the modified player apparatus shown in FIG. 4.

FIG. 5 is a block diagram of the Video to PCM decoder circuit 34 shown in FIG. 4. The circuit 34 includes a low pass filter 60 which receives the video from the video disc player 32 on line 30 (FIG. 4). The output of the low pass filter 60 is applied to a level adjust circuit 62. This circuit 62 utilizes conventional techniques to clamp the front porch 24 and back porch 26 levels (FIG. 3) to a reference voltage and then apply the signal to a voltage comparator to provide signal output at TTL levels corresponding to the video voltage levels in each of the bit cells 28a-p. Thus, level adjust circuit 62 strips the video signal of the horizontal sync pulses and provides the bits of data in TTL level for subsequent processing.

The output of the level adjust 62 is applied to the input of a shift register 64. The sixteen line outputs 66 of the shift register 64 are applied to sixteen inputs of a sixteen bit buffer register 68. The outputs 70 of the buffer register together comprise output line 40 of the converter (FIG. 4).

The horizontal sync pulses outputted from sync separator 32 (FIG. 4) are applied to an input line 72. The input line 72 is connected to the input of a phase locked loop ("PLL") oscillator 74 which produces a square wave clock output at 333.333 kilohertz locked in synchronization to the pulse input on line 72. The output of PLL 74 is connected to the CLOCK input of shift register 64 and to the COUNTDOWN input of a COUNTDOWN counter 76. The horizontal pulse input on line 72 is also connected to the rising edge input of a 500 nanosecond one shot 78. The output of one shot 78 is connected to the LOAD input of counter 76. The A-E input of the counter 76 is connected to the output of a digital switch 80 set to the digital value for the number nineteen. The BORROW output of counter 76 is connected to the LOAD input of buffer register 68 and to the falling edge input of a one microsecond one shot 82. The Q output of one shot 82 comprises the clock pulse line 42.

In operation, video is applied to line 30, and the level adjust 62 recovers the digital data from the video signal and applies it to the input of shift register 64 at TTL levels. Simultaneously, the recovered horizontal sync pulses are applied to PLL 74 which outputs a train of square wave pulses having a 50 percent duty cycle and a period of 3 microseconds. These pulses are synchronized with the horizontal sync pulses input on line 72, by the action of PLL 74. The output of PLL 74 is applied to the clock input of shift register 64 which causes the data at the input of shift register 64 to be shifted at a three microsecond rate. This shifting is in synchronization with the horizontal sync pulses and, consequently, the three microsecond bit cells of digital data appear at the input of the shift register 64 in synchronization with the pulses at the clock input of shift register 64.

Figure 6:
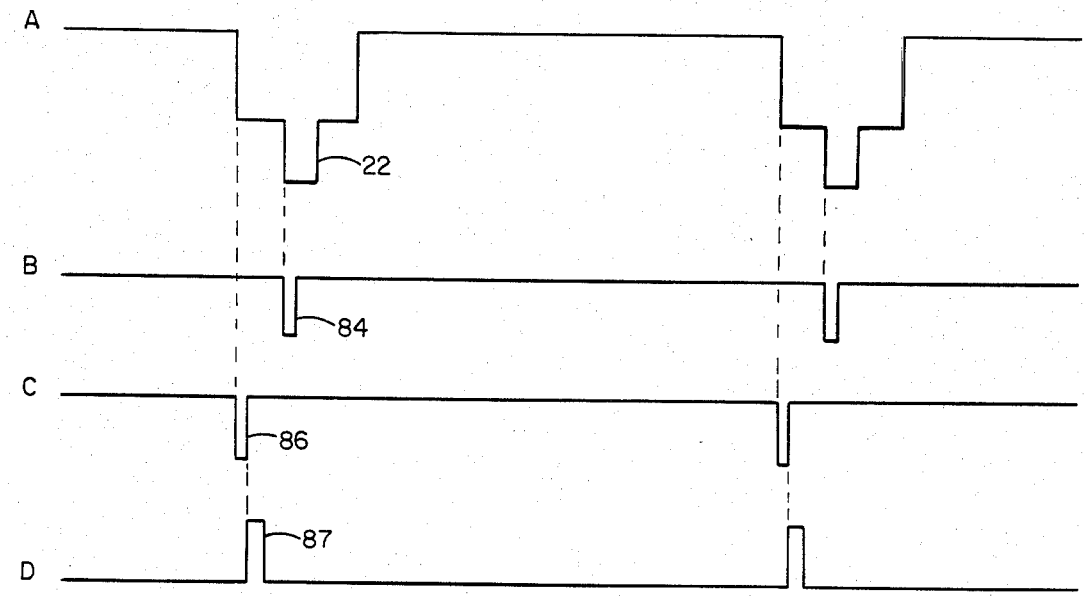
FIGS. 6 A-D illustrates the relative timing of various pulses which are produced by the circuit of FIG. 5.

The initial edge of the horizontal sync pulse on line 72 also triggers a 500 nanosecond one shot. Reference should now be had to FIG. 6 which illustrates the relative timing of the various pulses which are produced by the circuit shown in FIG. 5. The 500 nanosecond pulses outputted by one shot 78 are shown in FIG. 6B for comparison with the simplified waveform of the video data shown in FIG. 6A. The 500 nanosecond pulse output of one shot 78 is applied to the LOAD input of countdown counter 76. This causes the digital input on lines A-E of the counter 76, i.e., the value nineteen, to be loaded into the counter. Countdown counter 76 immediately begins counting down from nineteen at the rate of the pulse output of PLL 74.

Nineteen counts after the occurrence of the leading edge of the horizontal sync pulse, a 1.5 microsecond pulse 86 appears at the BORROW output of the counter 76, as shown in the FIG. 6C. From the timing of the circuitry it will be noted that this pulse 86 appearing at the borrow output of counter 76 coincides with the completion of the loading of shift register 64 with the digital data appearing at the output of converter 62. Thus, the buffer register 68 is loaded with the recovered data of an entire 16 bit PCM digital word at the occurrence of the pulse output from counter 76. The rising edge of the pulse output from counter 76 triggers a one microsecond one shot 82 to provide a one microsecond clock pulse 87, shown in FIG. 6D, after sufficient time has elapsed to ensure the loading of buffer register 68 and the existence of valid data therein.

The above sequence repeats cyclically with each horizontal sync pulse.

FIG. 7 is a block diagram of a data encoder for use in connection with an FM modulator for generating a signal for recording on an optical disc. A digital data source 90 is provided which has stored therein a sequential series of 16 bit PCM digital words corresponding to an analog waveform, for example an audio frequency waveform. This digital data source 90 can be, for example, a digital computer memory loaded with the aforementioned words. A PLL oscillator 92 is coupled to the digital data source 90 such that the bits of the stored digital data words are clocked out of the source 90 at the rate of the pulse output from PLL 92. PLL 92 is set to oscillate at 333.333 kilohertz, corresponding to a cycle period of 3 microseconds.

A source of horizontal sync pulses 22 at a horizontal sync rate of 15.873 kilohertz is provided on an input line 94 which is connected to the input of PLL 92, to the input of a one shot 96, and to the input of a level adjust circuit 98. The output of one shot 96 is connected to the input of a second one shot 100, the output of which is connected to the second input of AND gate 93. The output of level adjust circuit 98 is connected to one input of a summing circuit 102.

The DATA output of the digital data source 90 is connected to the input of a second level adjust circuit 104 the output of which is connected to a 4.5 megahertz low pass filter 106. The output of low pass filter 106 is connected to the second input of summing circuit 102.

Figure 8:
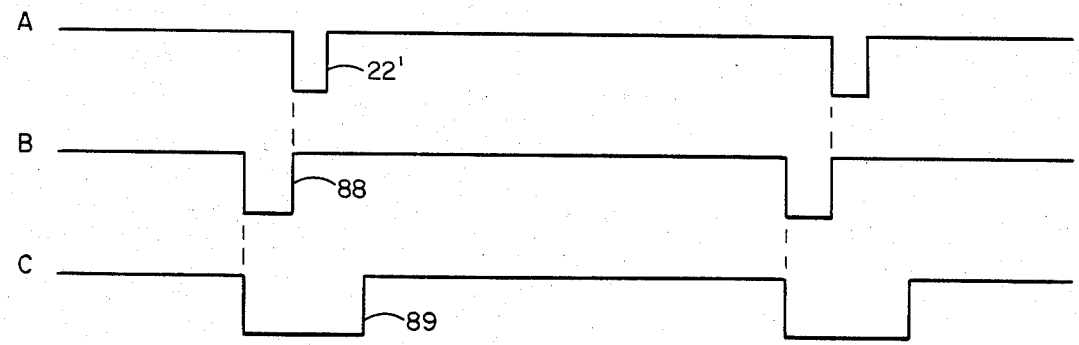
FIGS. 8 A-C shows timing of FIG. 7.

The circuit in FIG. 7 operates in the following manner. The horizontal sync pulses on line 94 are applied to the input of PLL 92 and serve to synchronize the square wave output of the phase lock loop 92 with the horizontal sync pulses. The horizontal sync pulses are also applied to the falling edge input of one shot 96 which, in response to the leading edge of the negative going horizontal sync pulses produces an output pulse having a duration of fifty-seven microseconds. Referring now to FIGS. 8A and 8B, the relationship of the timing between the horizontal sync pulses 22 and the pulse 88 output of one shot 96 can be seen. FIG. 8A shows the horizontal sync pulses 22/, while FIG. 8B shows the pulse 88 output of one shot 96.

Returning to FIG. 7, the output of one shot 96 is applied to the falling edge input of the second one shot 100, which produces a negative-going pulse 89 output, shown in FIG. 8C, having a duration of fifteen microseconds. The horizontal sync pulses have a period of sixty-three microseconds and a duration of 4.7 microseconds. By virtue of the relative timing of one shot 96 and one shot 100, the pulse 89 output of one shot 100 begins six microseconds prior to the leading edge of the subsequent horizontal sync pulse and ends 4.3 microseconds following the trailing edge of the subsequent horizontal sync pulse.

The output of one shot 100 is applied to the AND GATE 93 and has the effect of allowing the gating of sixteen bits of data from the data source 90 in three microsecond intervals beginning 4.3 microseconds following the trailing edge of the horizontal sync pulse and ending forty-eight microseconds after beginning. The output of the digital data source 90 is at TTL level. It is applied to the input of a level adjust circuit 104 which changes the level of the data signals from TTL to video level, i.e., zero to one hundred ire. The output of the level adjust circuit 104 is connected to the input of a low pass filter 106 which attenuates frequency components which fall outside of a 4.5 megahertz bandwidth. The output of the low pass filter 106 is connected to the second input of the summing circuit 102.

The summing circuit 102 combines the data signals output from low pass filter 106 and the horizontal sync pulses output from level adjust circuit 98, both of which are at video levels. The output of summing circuit 102 can, therefore, be used to FM modulate a carrier frequency signal which can, in turn, be used to drive an optical disc mastering apparatus.

The above described embodiment can be modified in accordance with the principals of the present invention. For example, the 4.5 megahertz bandwidth of a video channel permits a bit rate considerably higher than that utilized in the specific embodiment described above. Consequently, bit rates can be increased using any of various schemes, for example by using multilevel encoding instead of the two level encoding scheme described above. A chroma carrier can be added and provided with modulation in accordance with data bit information to further increase the information carrying capability of the recording medium.

Therefore, although the invention has been described in detail with reference to its presently preferred embodiment, it will be understood by one of ordinary skill in the art, that various modifications can be made without departing from the spirit and scope of the invention. Accordingly it is not intended that the invention be limited, except as by the appended claims.

I claim:

1. A method for recovering, at a predetermined rate, encoded digital data signals from a recording medium having said data recorded thereon in contiguous segments which alternate with cyclically recurring pulse signals recoverable as video level horizontal sync pulses by a recording medium video player apparatus, wherein no vertical sync pulse signals are recorded on said recording medium, comprising the steps of:

playing said recording medium on a predetermined format recording medium video player apparatus to recover the signals recorded thereon as video format signals;

separating said cyclically recurring pulse signals from said recovered signals;

synthesizing from said separated pulse signals, vertical pulse signals having a repetition rate, relative to said separated pulses, equal to the repetition rate of vertical sync pulses relative to horizontal sync pulses in said predetermined format;

providing said vertical sync pulses to the circuitry in said player apparatus which normally utilize, when recorded video is played, the separated vertical sync pulses from the recovered video; and decoding the recovered video format signals into digital data signals.

2. Apparatus for recovering, at a predetermined rate, encoded digital data signals from a recording medium having said data recorded thereon in contiguous segments which alternate with cyclically recurring pulse signals recoverable at video level horizontal sync pulses by a recording medium video player apparatus, wherein no vertical sync pulse signals are recorded on said recording medium, comprising:

a predetermined format recording medium video player apparatus for recovering video format signals from the recording medium;

means for decoding the video format signal recovered from the recording medium by the player into digital data signals;

means for separating said cyclically recurring pulse signals from said recovered video format signals;

means for synthesizing from said separated pulse signals, vertical pulse signals having a repetition rate, relative to said separated pulses, equal to the repetition rate of vertical sync pulses relative to horizontal sync pulses in said predetermined format; and means for providing said vertical sync pulses to the circuitry in said player apparatus which normally utilize, when recorded video is played, the separated vertical sync pulses from the recovered video.

3. A digital information recovery apparatus for use with a videodisc player requiring a vertical sync pulse to be received after each recovery of a predetermined number of horizontal sync pulses, said apparatus comprising:

an optically readable information bearing disc having the physical characteristics of a standard optical video disc and having optically readable segments of digital information in at least video luminance signal format interleaved with standard video horizontal sync pulses having an intended repetition rate of approximately 15 kilohertz and no vertical sync pulses;

means for receiving a video format signal produced by playing said disc on a videodisc player and for decoding the digital information therefrom; and a vertical sync generator means having an input for receiving the video level signal resulting from playing said disc on the video disc player, said generator means including:

horizontal sync separator means for separating the reproduced horizontal sync pulses from the digital information received on said input;

counter means for counting the horizontal sync pulses; and vertical sync pulse synthesizer means responsive to said counter means for outputting a vertical sync pulse for use by the video disc player and for resetting said counter means each time said counter means receives said predetermined number of horizontal sync pulses.

4. The apparatus as claimed in claim 3, further comprising selector means coupled to said synthesizer means for setting said predetermined number, a first mode of said selector means setting said predetermined number equal to 262.5 and a second mode of said selector means setting said predetermined number equal to 312.5.

5. The apparatus as claimed in claim 4, further comprising summing means for summing the output of said sync separator means with the output of said synthesizer means to form a composite sync signal for use by the player.

6. The apparatus as claimed in claim 4, further comprising oscillator means for generating a reference sync signal for use by the player at said intended repetition rate of approximately 15 kilohertz.

* * * * *